United States Patent Office 3,433,841
Patented Mar. 18, 1969

3,433,841
PURIFICATION PROCESS
John S. Dehn and John Arnold Glass, Texas City, Tex., assignors to Monsanto Company, St. Louis, Mo., a corporation of Delaware
No Drawing. Filed Dec. 22, 1966, Ser. No. 603,756
U.S. Cl. 260—643           9 Claims
Int. Cl. C07c 29/24

ABSTRACT OF THE DISCLOSURE

Removal of iron carbonyl impurities from stream containing the same, particularly alcohol streams, by passing the stream to be purified through a cation exchange resin having a portion of the exchange sites occupied by either cupric, argentous, auric, ceric, or thallic ions.

BACKGROUND OF THE INVENTION

The present invention relates to a method for the purification of fluid streams. More particularly, the present invention relates to the removal of iron carbonyl impurities from fluid streams.

The products of many reactions contain iron carbonyls as impurities, especially those reactions conducted wherein carbon monoxide is a reactant. This is generally due to the reaction of any iron present during the reaction either in the catalyst or the reactor system itself with carbon monoxide to produce the iron carbonyls, which include iron pentacarbonyl, iron tetracarbonyl, and iron nonacarbonyl. Iron pentacarbonyl is the most frequently occurring of the iron carbonyls and the present invention is particularly useful in the removal of iron pentacarbonyl. The reaction of mixtures comprising carbon monoxide and hydrogen is used to produce many different products. For example, the reaction of carbon monoxide with hydrogen or the reaction of a mixture of carbon monoxide and carbon dioxide with hydrogen may be used for the production of methanol or may be used to produce higher alcohols, hydrocarbons, ketones, and aldehydes according to the well-known Fischer-Tropsch synthesis. The Fischer-Tropsch synthesis is particularly adapted to the production of hydrocarbon compounds such as gasoline. The reaction of carbon monoxide and hydrogen in the presence of olefins according to the well-known Oxo synthesis produces a final product which is frequently a mixture of alcohols of various molecular weights and isomeric configurations as well as ketones and aldehydes. The Oxo synthesis may be accomplished in either a one-step reaction or, as is more generally practiced, in a two-step process. In all of these well-known processes where a mixture comprising carbon monoxide and hydrogen is reacted, iron carbonyls are usually present as impurities.

SUMMARY

It is therefore an object of the present invention to provide a process for the purification of streams containing iron carbonyl as an impurity. Another object of the present invention is to provide a process for the removal of iron carbonyl impurities from the reaction products produced by reacting a mixture comprising carbon monoxide and hydrogen. A particular object of the present invention is to provide a process for the removal of iron carbonyl from alcohols. Additional objects will become apparent from the following description of the present invention.

The present invention in one of its embodiments comprises a process for the removal of iron carbonyl impurities from streams containing said iron carbonyls as impurities which comprises passing said stream through a resin bed, said resin bed comprising a cation exchange resin having at least a portion of the exchange sites thereof occupied by metal ions, said metal ions being selected from the group consisting of cupric ions, argentous ions, auric ions, ceric ions, thallic, and mixtures thereof. These ions are the ions of copper, silver, gold, cerium, and thallium in their higher oxidation states. The terms "metal ions," "metallic ions," "metal" and "metallic" as used in the remainder of the specification is intended to refer to the foregoing group of metals or ions thereof unless otherwise stated.

DESCRIPTION OF THE PREFERRED EMBODIMENTS

As the stream containing the iron carbonyl impurities is passed through the resin bed, an oxidation-reduction reaction takes place wherein the metal ions retained on the resin bed are reduced to a lower oxidation state, and the iron in the iron carbonyls is oxidized to the ferrous state. For example if the metal ions retained on the bed were cupric ions, they would be reduced to cuprous ions. The iron which has been oxidized to the ferrous ion is retained in the resin bed while the carbon monoxide produced in the oxidation-reduction reaction passes out of the bed with the fluid which is being purified. The carbon monoxide can then be removed from the fluid in a conventional manner. If the fluid which is being purified is a liquid, then most of the CO will go off as a gas.

The resins useful in the present invention having exchange sites occupied by metal ions may be prepared by passing an aqueous solution of a metal salt of the metal ions useful in the present invention through a cation exchange resin bed so as to replace the cations in the cation exchange resin with these metal ions. The cations replaced by the metal ions will generally be either sodium ions or hydrogen ions. Generally, an aqueous solution of a metal chloride will be used; however, aqueous solutions of almost any soluble metal salt may be used. Some non-limiting examples of suitable metallic salts include cupric nitrate, cupric sulfate, cupric chloride, cupric bromide, cupric dichromate, cupric fluoride, cupric bromate, cupric chlorate, cupric acetate, cupric salicylate, silver nitrate, silver fluoride, silver perchlorate, auric bromide, auric chloride, auric cyanide, ceric nitrate, thallium tribromide, thallic nitrate, thallium trichloride, and the like. The aqueous solution of the metallic salt will generally be passed through the cation exchange resin bed at a temperature of from 0° C. to 120° C. and at a pressure which is sufficient to keep the aqueous solution in the liquid phase, which pressure will generally be at or about atmospheric pressure. The flow rate of the aqueous solution of the metal salt through the bed may vary over wide limits, usually ranging from about ½₀ gallon per cubic foot of bed per minute and lower to about 4 gallons per cubic foot of bed per minute and higher. Naturally, the faster the flow through the bed, the faster the replaceable cations therein will be replaced with metal ions. Not all the replaceable ions need be replaced with metal ions in order to practice the present invention; however, it is obvious the fewer the number of metal ions that are retained on the bed then the sooner the bed will require regeneration.

When the resin beds of the present invention have been exhausted, they may be regenerated by passing a 10% hydrogen chloride, nitric acid or sulfuric acid solution through the bed followed by passing an aqueous solution of a metal salt through the bed.

The cationic ion exchange resins used for the preparation of the resin beds useful in the present invention may be either a weak acid cation exchange resin, an intermediate acid cation exchange resin, or a strong acid cation exchange resin; however, the strong acid cation resins are preferred. Cation exchange resins are high molecular weight polyacids which are virtually insoluble in aqueous and most non-aqueous media. The acids which constitute the exchange groups of the cation exchange resins useful in the present invention may be either strong acid groups, intermediate acid groups or weak acid groups. The strong acid groups will generally be nuclear sulfonic or methylene sulfonic, which are the preferred groups for the practice of the present invention, while the weak acid groups will be carboxylic acid or phenolic hydroxyl groups. The intermediate acid groups are generally phosphonic, phosphonous, or phosphoric. The cation exchange resins are generally prepared by first forming an insoluble, infusible polymer matrix into which active acidic groups can be introduced by appropriate chemical action. However, a few resins are made by a one-step condensation. The preferred cation exchange resins have a matrix of cross-linked polystyrene such as a copolymer of a major proportion of styrene and a minor proportion of divinylbenzene and/or ethylvinylbenzene. Compounds such as isoprene or butadiene may also be used as cross-linking agents. Such a cross-linked polystyrene matrix may be converted to a strong acid exchange resin by sulfonation. Also, many cation exchange resins are based upon matrices which are phenol-formaldehyde condensates. Most of the weak acid cation exchange resins are carboxylic resins which are generally made by copolymerizing an acid such as acrylic acid or methacrylic acid with a cross-linking agent such as divinylbenzene. The carboxylic cation exchange resins may also be made by hydrolyzing a cross-linked polymer of an ester such as acrylic acid ester.

The cation exchange resins useful in the present invention may be of various sizes and shapes. Generally those having a cross-linked styrene polymer matrix are in the form of beads, while those having a matrix of a phenol-formaldehyde condensate are granular. Those cation exchange resins having a matrix formed from an acid such as acrylic acid or its ester are also usually in the form of beads. The mesh size will generally be between about 10 and 70 mesh although the present invention is not limited to any particular mesh size.

The temperature at which the process of the present invention is operated may vary over a relatively wide range. The lower temperature limit, of course, is limited by the kinetics of the reaction between the iron carbonyl impurities and the metal ion which has been retained in the cationic exchange resin bed. Higher temperatures favor this reaction; however, the decomposition temperature of the particular cation exchange resin being used must not be exceeded. For most cation exchange resins, this decomposition temperature will be around 120° C. It is preferred to operate the present invention at a temperature of at least 0° C. and not above 120° C., particularly in the range of about 10° to about 70° C.

The iron carbonyl containing streams which are to be purified may be passed through the resin bed of the present invention either as a gas or as a liquid. Usually, the impure streams containing iron carbonyls will be in the liquid phase. In practicing the present invention with respect to the purification of alcohols, it is preferred that the alcohols be liquid.

The pressures which may be used in the present invention may vary from atmospheric pressure or lower up to pressures of several atmospheres, i.e., 15 atmospheres and higher. Generally, pressures at or near atmospheric pressure are employed unless a higher pressure is desired in order to keep the stream being purified in the liquid phase. For example, in the purification of methanol, pressures of above one atmosphere might be used if the temperature of the process of the present invention is above the boiling point of methanol.

In operating the process of the present invention, the flow rate of the iron carbonyl-containing stream to be purified through the resin bed is a matter of choice provided the load limits of the bed are not exceeded. For example, the flow rate through the bed may vary from 1/20 gallon per cubic foot of bed per minute to about four gallons per cubic foot of bed per minute. The maximum flow rate through the bed will, of course, vary with the size of the particular resin being used but will usually be within the above ranges.

Practically any stream containing iron carbonyls as impurities may be purified according to the present invention. Most frequently such iron carbonyl-containing streams are those resulting from the reaction of a mixture comprising carbon monoxide and hydrogen wherein iron is present in the catalyst and/or the reactor surfaces. The present invention is particularly useful in the purification of monohydroxy alcohols having from 1–15 carbon atoms containing iron carbonyls as impurities. Among the alcohols which may be purified are ethanol, isopropyl alcohol, n-butanol, the octanols, the decanols, 1-dodecanol, tridecanol, and 1-pentadecanol. In its preferred utilization, the process of the present invention is used for the removal of iron carbonyls from methanol. The alcohols which may be purified according to the present invention are not limited to those produced by the reaction of a mixture comprising carbon monoxide and hydrogen.

Although all of the metals discussed herein are effective in the present invention, the metals of Group 1–B of Mendeleev's Periodic Table in their higher oxidation state will generally be used. Group 1–B contains copper, silver and gold and thus generally a metal ion selected from the group consisting of cupric ions, argentous ions, auric ions, and mixtures thereof will be used. Cupric ions are especially preferred as the metal ions which are retained on a resin bed according to the present invention.

The following example is given to illustrate but not to limit the present invention.

EXAMPLE I

A resin bed was prepared by filling a 1-inch diameter tube to a depth of 16 inches with a nuclear sulfonic acid cationic exchange resin known as Amberlite IR–200. This cation exchange resin had a matrix which was a styrene-divinyl benzene copolymer and was in the form of beads which were between 20 and 70 mesh in size. A 2% aqueous solution of cupric chloride was passed through the bed at a rate of about 0.35 gallon per cubic foot per minute at about 25° C. and atmospheric pressure in order to replace the replaceable hydrogen ions of the exchange resin with cupric ions. Methanol which had been prepared by reacting CO with $H_2$ in the presence of a catalyst at about 375° C. and which contained about 100 parts per billion iron pentacarbonyl was then passed through the bed at a rate of about 0.35 gallon per cubic foot per minute and at a temperature of about 25° C. The effluent from the bed contained about 35 parts per billion iron pentacarbonyl.

EXAMPLE II

A resin bed was prepared in the same manner as that in Example I and 1-decanol containing about 100 parts per billion iron pentacarbonyl is passed through the bed at a rate of about 2 gallons per cubic foot per minute and at about a temperature of 30° C. The effluent from the bed contains less than about 40 parts per billion of iron pentacarbonyl.

EXAMPLE III

A resin bed is prepared as in Example I except that a one percent aqueous solution of ceric nitrate was passed through the bed in order to place ceric ions on a portion of the exchange sites of the cation exchange resin. Ethanol containing about 80 parts per billion of iron pentacarbonyl is passed through the bed with the resulting effluent containing less than 11 parts per billion of iron pentacarbonyl.

EXAMPLE IV

Methanol containing about 65 parts per billion of iron pentacarbonyl was passed through a bed of Amberlite IR-200 having a depth of about 16 inches. No decrease in the iron carbonyl content was detected in the effluent methanol thus illustrating that a cation exchange resin having none of the active sites occupied by the metal ions of the present invention is not effective for the removal of iron carbonyls.

After passing the product to be purified through the cation exchange resin bed on which the metallic ions are retained, it will generally be desirable to pass the product through a second resin bed which is comprised of a cation exchange resin. Although this is not necessary in order to practice the present invention, such a second resin bed will act as a buffer to pick up any iron or other metal bleeding through the first bed. The second bed can be in a different structure from the first bed or the two beds can be in contact with each other in the same structure. The cation exchange resin used in the second bed is preferably the same as that used to produce the resin bed on which the metal ions are retained; however, a different cation exchange resin can be used.

The present invention is not to be construed as being limited to the purification of streams containing iron carbonyls as the only impurities. The present invention is especially useful for the removal of amines. The amines are basic and, therefore, when a stream containing these amines is passed through the resin bed, an amine salt is formed which is retained on the resin. The formation of amine impurities occurs frequently, especially in the production of alcohols, when a synthesis gas contains some nitrogen. Some amines which may be formed are methylamine, dimethylamine, trimethylamine, propylamine, butylamine, etc.

Also, in the production of alcohols where minor amounts of ketones and aldehydes are present, the cation exchange resin in the ferric state will catalyze a reaction between the alcohols and the carbonyl compounds to form the corresponding acetals and ketals of those carbonyl compounds. This is advantageous as the ketals and acetals are less subject to oxidation than the ketones and aldehydes and therefore increases the permanganate time of the alchols. Some frequently occurring ketones and aldehydes are isobutyraldehyde, butanone-2, acetone, propionaldehyde, formaldehyde, and the like.

What is claimed is:

1. A process for the removal of iron carbonyl impurities from an alkanol stream containing such impurities, said alkanol having 1 to 15 carbon atoms, which process comprises passing said stream at a temperature of from about 0° C. to about 120° C. through a resin bed, said resin bed comprising a cation exchange resin having at least a portion of the exchange sites thereof occupied by metal ions, said metal ions being selected from the group consisting of cupric ions, argentous ions, auric ions, ceric ions, thallic ions and mixtures thereof.

2. The process of claim 1 wherein the pressure is sufficient to keep said stream containing iron carbonyl impurities in the liquid phase.

3. The process of claim 2 wherein said iron carbonyl impurities comprise principally iron pentacarbonyl.

4. The process of claim 3 wherein said stream containing iron carbonyl impurities comprises methanol.

5. The process of claim 4 wherein said cation exchange resin is a strong acid cation exchange resin.

6. The process of claim 5 wherein said metal ions are cupric ions.

7. The process of claim 6 wherein the temperature is from about 10° C. to about 70° C.

8. The process of claim 7 wherein said cation exchange resin is a sulfonated cation exchange resin.

9. The process of claim 4 wherein the effluent from said resin bed is passed through a second bed comprising cation exchange resin.

References Cited

UNITED STATES PATENTS

| | | | |
|---|---|---|---|
| 1,766,763 | 6/1930 | Pier et al. | 260—440.5 |
| 2,631,127 | 3/1953 | D'Alelio | 210—38 |
| 2,792,344 | 5/1957 | Tidwell. | |
| 3,373,180 | 3/1968 | Glass et al. | |

LEON ZITVER, *Primary Examiner.*

J. E. EVANS, *Assistant Examiner.*

U.S. Cl. X.R.

210—24, 38; 260—2.2, 450